(12) United States Patent
Shimomura et al.

(10) Patent No.: US 6,879,247 B2
(45) Date of Patent: Apr. 12, 2005

(54) VEHICLE ANTI-THEFT DEVICE AND ANTI-THEFT INFORMATION CENTER

(75) Inventors: Toshio Shimomura, Chiryu (JP); Ifushi Shimonomoto, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/293,286

(22) Filed: Nov. 14, 2002

(65) Prior Publication Data

US 2003/0095039 A1 May 22, 2003

(30) Foreign Application Priority Data

Nov. 19, 2001 (JP) ...................................... 2001-353471

(51) Int. Cl.$^7$ .............................................. B60R 25/10
(52) U.S. Cl. ........................... 340/426.18; 340/426.16; 340/426.24; 340/426.25; 340/539.22
(58) Field of Search ..................... 340/425.5, 426.13, 340/426.15, 426.16, 426.18, 426.2, 426.22, 426.23, 426.24, 426.25, 436, 539.22, 593.25, 539.1; 307/10.2, 10.5, 10.6; 342/357.07, 357.09; 296/76

(56) References Cited

U.S. PATENT DOCUMENTS

| | | | | |
|---|---|---|---|---|
| 5,027,104 A | * | 6/1991 | Reid ..................... | 340/426.18 |
| 5,223,844 A | * | 6/1993 | Mansell et al. ......... | 342/357.07 |
| 5,719,771 A | * | 2/1998 | Buck et al. ............. | 340/438 |
| 5,801,618 A | * | 9/1998 | Jenkins .................. | 340/426.14 |
| 5,939,975 A | * | 8/1999 | Tsuia et al. ............ | 340/426.18 |
| 6,232,873 B1 | | 5/2001 | Dilz et al. .............. | 340/426.25 |
| 6,323,761 B1 | * | 11/2001 | Son ........................ | 340/426.35 |

FOREIGN PATENT DOCUMENTS

| | | |
|---|---|---|
| JP | A-H10-71902 | 3/1998 |
| JP | A-H10-315917 | 12/1998 |
| JP | A-2000-272475 | 10/2000 |

OTHER PUBLICATIONS

Lexus LS 430, New Car Features (UCF30 Series/Aug., 2000).

* cited by examiner

*Primary Examiner*—Van T. Trieu
(74) *Attorney, Agent, or Firm*—Posz & Bethards, PLC

(57) ABSTRACT

An anti-theft device monitors an object or person approaching a vehicle from the surrounding area of the vehicle by using a surrounding area sensing sensor when an authorized vehicle user moves away from the vehicle which causes the anti-theft device to be activated. If the anti-theft device detects the object or person, the anti-theft device activates an alarm. The anti-theft device transmits images and surrounding area details of the vehicle to the information center. If the vehicle is illegally accessed, the occurrence of any illegal activity is detected by a break-in sensor that issues a break-in alarm, simultaneously with the transmission of vehicle information to the information center, indicating the current disposition of the vehicle. Then, the information center determines that the vehicle is being illegally operated and transmits the vehicle information accumulated at that moment to a manager terminal.

20 Claims, 5 Drawing Sheets

VEHICLE ANTI-THEFT DEVICE AND ANTI-THEFT INFORMATION CENTER

CROSS REFERENCE TO RELATED APPLICATION

This application is based upon, claims the benefit of priority of, and incorporates by reference the contents of prior Japanese Patent Application No. 2001-353471 filed Nov. 19, 2001.

BACKGROUND OF THE INVENTION

1. Field of the Invention

The present invention relates to a vehicle anti-theft device and an anti-theft information center which are used to detect illegal activity on a vehicle in order to inform a vehicle manager of the occurrence of the illegal activity.

2. Description of the Related Art

Generally known is an anti-theft device which is designed to detect the occurrence of illegal activity to a vehicle in the case where the vehicle is illegally acted upon by a third party. Examples of illegal activity by a third party include: attempting to open a vehicle door or a trunk lid other than by use of an authorized key, attempting to break a window glass of a vehicle, attempting to move a vehicle itself using a wrecker, tow truck or the like, or the case in which a third party attempts to start an engine other than by use of an authorized key. In the case of one or more of the above occurrences, an alarm will sound from the vehicle.

Additionally, as described in Japanese Patent Laid-open Publication No. 2000-272475, there is also known an anti-theft device not only for sounding an alarm, a flashing lamp or the like, but also for wirelessly transmitting vehicle information. The transmission indicates the vehicle status at the occurrence of the illegal activity. That is, the current position of the vehicle, the particular type of the illegal activity, and the like are transmitted to an information terminal of the vehicle manager or an anti-theft information center operated by a security company.

According to such an anti-theft device, the illegal activity of the vehicle can quickly be reported to a vehicle manager to indicate the activity to the vehicle. Even if a vehicle is stolen, it is possible to quickly find the vehicle based on the status of the vehicle at that moment which includes the vehicle's current position and the like. Therefore, thwarting vehicle theft and damage are possible.

However, the above-described conventional anti-theft device has the following problem. Since such an anti-theft device is designed to detect and transmit vehicle status after detection of an illegal activity to the vehicle, the amount of information which can be transmitted to the information terminal of the vehicle manager or the anti-theft information center is extremely small in the case where a person performing the illegal activity breaks into the vehicle and breaks any necessary information transmitting device. As a result, the anti-theft device is disadvantaged and potentially incapable of finding a stolen vehicle or identifying a person based on the transmitted information.

More specifically, although a conventional anti-theft device functions extremely effectively when a vehicle intruder does not break the information transmission device, it does not effectively function when an intruder is familiar with the functions and the structure of such an anti-theft device and is capable of breaking the transmitting device. In this case, the device fails to sufficiently prevent vehicle theft and vandalism.

SUMMARY OF THE INVENTION

In view of the above-described problems, an object of the present invention is to provide a vehicle anti-theft device and an anti-theft information center. Together, the devices will be capable of ensuring the transmission of information necessary to identify that a person is performing an illegal activity when an illegal activity related to a vehicle takes place.

A vehicle anti-theft device according to a first aspect of the present invention includes access detection means for detecting access of an object to a vehicle from a surrounding area of the vehicle in addition to illegal activity detection means for detecting an illegal activity of the vehicle performed by a person or object. When access of the object to the vehicle is detected by the access detection means, surrounding area information storage means acquires surrounding area information indicating a state of the surrounding area of the vehicle so as to store it to a predetermined storage medium.

When the object approaching the vehicle is someone who attempts to illegally access the vehicle and that person actually illegally accesses or operates the vehicle, the illegal activity detection means detects the occurrence of the illegal activity. Examples of an illegal activity are: an attempt to open a door or a trunk lid by some illegal means other than by use of an authorized key, an attempt to break a glass window to break into the interior of the vehicle, an attempt to move the vehicle itself by a tow truck or the like, and an attempt to start the engine by an illegal activity other than by use of an authorized key.

When the illegal activity detection means detects the occurrence of the illegal activity of the vehicle in this manner, the vehicle information transmission means first wirelessly transmits the surrounding area information stored in the storage medium to a vehicle manager information terminal or an anti-theft information center. The vehicle information transmission means then wirelessly transmits vehicle information indicating the status of the vehicle to the vehicle manager information terminal or the anti-theft information center.

Therefore, according to the present invention, even if a person breaks into the vehicle and breaks the transmitting device constituting the vehicle information transmission means, it is possible to transmit the surrounding area information indicating a state of the surrounding area while the person is still approaching the vehicle. Alternatively, the vehicle information which indicates a status of the vehicle can be transmitted immediately after the occurrence of the break-in to the vehicle manager information terminal or the anti-theft information center.

Thus, according to the present invention, even in the case where a person illegally accessing the vehicle breaks the transmitting device, the vehicle manager information terminal or the anti-theft information center can identify the state of access of the person with respect to the vehicle and the person's technique of illegal entry or the like, which also allows, in many instances, the person to be easily identified. Therefore, with the anti-theft device of the present invention being mounted on the vehicle, the number of people who intend to perform illegal activities on vehicles may be reduced thereby preventing vehicle theft from occurring.

Although the occurrence of vehicle theft cases can be prevented according to the present invention, it is conceivable that people who are ignorant that anti-theft devices of the present invention are mounted on the vehicle may attempt to illegally access the vehicle. In order to force such people to abandon the idea of illegally accessing the vehicle, an alarm means is activated when vehicle access is detected by the access detection means which sounds an alarm to the area surrounding the vehicle. In this manner, the person who is approaching the vehicle with the intent of stealing the vehicle or performing mischief on or to the vehicle is informed that the vehicle is in a guarded state, thereby forcing the person to abandon the idea of committing an illegal act on the vehicle.

The surrounding area information, which is stored in the storage medium by the surrounding area information storage means when the access detection means detects access of an object to the vehicle, may be the size, the direction or the like of the object approaching the vehicle. Preferably, according to a third aspect of the present invention, it is desirable that the surrounding area information storage means is provided with an image pick-up means for capturing images of the surrounding area of the vehicle so as to store the image information acquired by the image pick-up means as the surrounding area information in the storage medium.

In this manner, when an illegal act is performed on the vehicle, the image information containing the image of the person is transmitted from the anti-theft device to the vehicle manager information terminal or the anti-theft information center. The vehicle manager information terminal or the anti-theft information center is then able to attempt to identify the person from the image information.

In the case where a third party approaches the vehicle and causes damage such as slashing a tire or writing graffiti on the car body, the illegal activity detection means is sometimes incapable of detecting such mischief and fails to quickly transmit the occurrence of the mischief to the vehicle manager information terminal or the anti-theft information center. However, according to the anti-theft device of the third aspect, since the image information containing the image of a person who committed the illegal act is stored in the storage medium, it is possible to easily identify the person who committed the act on the vehicle by using the image information stored in the storage medium.

The image pick-up means for capturing images of the surrounding area of the vehicle may include a plurality of cameras for capturing the images of the surrounding area of the vehicle in each direction, i.e., a rear direction, a forward direction and lateral directions (right and left), or may include an omni-directional camera employing a fish-eye type camera or the like. It is preferred that this camera is an infrared camera to allow the images of the surrounding area to be captured in low light situations and even in the darkness of night.

On the other hand, the above-described anti-theft device according to the first to third aspects of the present invention stores the surrounding area information in the storage medium when an object is approaching the vehicle, and wirelessly transmits the surrounding area information stored in the storage medium to the vehicle manager information terminal or the anti-theft information center when the approaching object (person) performs the illegal activity on the vehicle. However, the surrounding area information may be transmitted from the anti-theft device to the anti-theft information center when the object is approaching the vehicle so that the surrounding area information can be stored in the anti-theft information center as long as the anti-theft device has a system of informing the vehicle manager information terminal of the occurrence of the illegal activity on the vehicle via the anti-theft information center. In order to perform such processing, it is sufficient to construct the anti-theft device according to a fourth aspect of the present invention and the anti-theft information center according to a seventh aspect of the present invention.

Specifically, in the anti-theft device according to the fourth aspect of the present invention, when the access detection means is detecting access of an object, person, or other item to the vehicle, the surrounding area information transmission means wirelessly transmits the surrounding area information indicating a state of the surrounding area of the vehicle to the anti-theft information center. Thereafter, when the illegal activity detection means detects the illegal activity of, or on, the vehicle by a third party, the vehicle information transmission means wirelessly transmits the vehicle information indicating the status of the vehicle to the anti-theft information center.

On the other hand, in the anti-theft information center according to the seventh aspect of the present invention, when the surrounding area information is transmitted from the surrounding area information transmission means of the anti-theft device, the surrounding area information storage means stores the transmitted surrounding area information in a predetermined storage medium. Thereafter, when the vehicle information is transmitted from the vehicle information transmission means of the anti-theft device, the illegal activity notification means identifies illegal vehicle activity from the transmitted vehicle information so as to notify the vehicle manager information terminal corresponding to the identified vehicle of the occurrence of the illegal activity related to the vehicle.

Therefore, with the anti-theft system being constructed by using the anti-theft device according to the fourth aspect and the anti-theft information center according to the seventh aspect, when a third party illegally accesses a vehicle, it is possible to notify the vehicle manager information terminal of the occurrence of the access. Moreover, even if the transmitting device (i.e., the vehicle information transmission means or the surrounding area information transmission means) mounted on the vehicle is broken by a third party after the third party accesses the vehicle by the illegal activity, the surrounding area information, when the person attempting to perform the illegal activity is approaching the vehicle, is transmitted to the anti-theft information center to be accumulated in the storage medium of the anti-theft information center. As a result, the person can be easily identified from the accumulated surrounding area information.

Thus, according to the anti-theft system constructed by using the anti-theft device according to the fourth aspect and the anti-theft information center according to the seventh aspect, the number of people attempting to illegally access vehicles will be reduced which will prevent vehicle theft cases from taking place, as in the case where the anti-theft device according to the first aspect is used. If, according to a fifth aspect of the present invention, the alarm means for giving an alarm to the surrounding area of the vehicle, when the access of an object to the vehicle is detected by the access detection means, is provided in the anti-theft device according to the fourth aspect, the same effects as those obtained with the anti-theft device according to the second aspect can be obtained.

In the anti-theft system constructed by using the anti-theft device according to the fourth or fifth aspect of the invention and the anti-theft information center according to the seventh aspect, the anti-theft device may alternatively be constructed as one according to a sixth aspect of the present invention. More specifically, in the anti-theft device according to the sixth aspect of the invention, the image pick-up means for capturing images of the surrounding area of the vehicle is provided for the surrounding area information transmission means. The surrounding area information transmission means transmits the image information acquired by the image pick-up means, as the surrounding area information, to the anti-theft information center. Therefore, when an object is approaching the vehicle, the image information containing the image of the object is stored in the storage medium of the anti-theft information center. As a result, when the vehicle is illegally operated, a person who has illegally operated the vehicle can be more certainly identified from the image information stored in the storage medium.

With the anti-theft device according to the sixth aspect, even in the case where a third party approaching the vehicle committed an act of vandalism on the vehicle, such as slashing a tire or writing graffiti on the car body, the person who has committed such an act can be easily identified by using the image information stored in the storage medium because the image information containing the image of that person is stored in the storage medium of the anti-theft information center.

In the anti-theft device according to the sixth aspect, it is preferable to use an infrared camera as the image pick-up means for capturing images of the surrounding area of the vehicle. This is similar to the image pick-up means provided in the anti-theft device according to the third aspect.

On the other hand, in the anti-theft information center according to the seventh aspect, it is sufficient for the illegal activity notification means to merely notify the vehicle manager information terminal corresponding to the illegally operated vehicle, of the occurrence of the illegal activity on the vehicle upon reception of the vehicle information. However, according to an eighth aspect, for example, the illegal activity notification means may also read out the surrounding area information corresponding to the illegally operated vehicle so as to transfer the readout surrounding area information and the received vehicle information to the corresponding vehicle manager information terminal.

In this manner, it is possible to quickly provide the vehicle manager with the vehicle information when the vehicle is illegally accessed and the surrounding area information when a person who intends to commit an illegal act on the vehicle approaches the vehicle. As a result, the vehicle manager can locate the person who commits an illegal act on the vehicle, based on the information, and prevent the vehicle from being accessed or stolen. Even in the case where the vehicle manager is away from the vehicle and therefore is not capable of preventing the vehicle from being stolen, the vehicle manager can identify the person from the information transferred to the vehicle manager information terminal so as to quickly report the person to the police or authorities.

Next, it is recommended to construct the anti-theft information center according to the seventh or eighth aspect so as to make it capable of providing the surrounding area information stored in the storage medium of the vehicle manager information terminal in accordance with a request from the vehicle manager information terminal. In order to realize such a structure, the anti-theft information center may be constructed according to a ninth aspect of the invention.

More specifically, the surrounding area information transfer means is provided for the anti-theft information center according to the ninth aspect of the invention. Upon reception of a transmission request for the surrounding area information from the vehicle manager information terminal, the surrounding area information transfer means reads the surrounding area information of the vehicle corresponding to the vehicle manager information terminal from the storage medium in accordance with the transmission request so as to transfer the readout surrounding area information to the corresponding vehicle manager information terminal.

Therefore, according to the anti-theft information center of the ninth aspect, for example, even in the case where the vehicle information, when the vehicle is illegally accessed or operated, is not transmitted from the anti-theft device in spite of the occurrence of the illegal activity of the vehicle, or the case where the vandalism (tire slashing, graffiti or the like) which is not detectable by the illegal activity detection means is done on the vehicle, the vehicle manager can quickly acquire the information of the surrounding area of the vehicle in order to identify the person committing the act.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
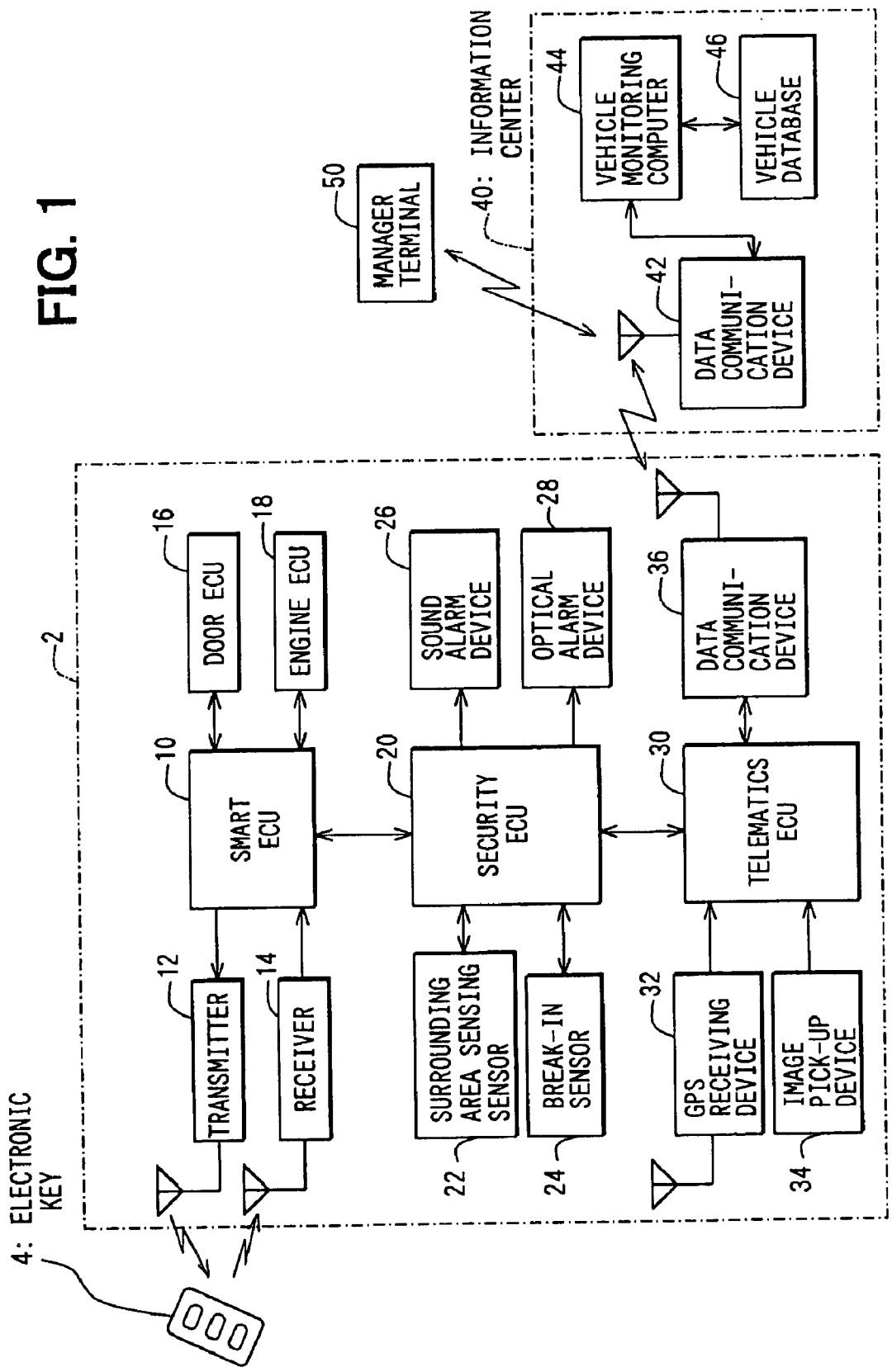
FIG. 1 is a block diagram showing a structure of the entire anti-theft system according to an embodiment of the present invention.

FIG. 1 is a system structure diagram showing a structure of the entire anti-theft system of an embodiment, to which the present invention (more specifically, the fourth to ninth aspects) is applied.

As shown in FIG. 1, the anti-theft system of this embodiment includes an anti-theft device 2 mounted on a vehicle such as an automobile and an anti-theft information center (hereinafter, referred to simply as the information center) 40 for monitoring the status of the vehicle on which the anti-theft device 2 is mounted. The information center 40 monitors through data communication with the anti-theft device 2. The information center 40 notifies a manager information terminal (hereinafter, referred to simply as the manager terminal) 50 owned by a manager (user or owner) of the vehicle, of the occurrence of an illegal activity or act when the vehicle is illegally operated or acted upon by a third party.

The anti-theft device 2 mounted on the vehicle is mainly constructed of: a smart Electronic Control Unit, hereinafter ECU 10, which is essentially a microcomputer; a security ECU 20; and a telematics ECU 30. The smart ECU 10 allows automatic lock and unlock activitys of a door through data communication with an electronic key 4 owned by a user. The security ECU 20 monitors any access of an object to the vehicle, illegal activity and entry of the vehicle by a third party, and the like, and activates an alarm including sounds and/or light in accordance with the result of monitoring. The telematics ECU 30 transmits various information such as the images of the surrounding area of the vehicle and the current position of the vehicle to the information center 40 in accordance with the monitoring state by the security ECU 20. The information center 40 includes a data communication device 42 for performing wireless data communication with the anti-theft device 2 mounted on the vehicle or the manager terminal 50, a computer for vehicle monitoring (vehicle monitoring computer) 44, and a vehicle database 46 for storing information for each vehicle to be monitored.

In the anti-theft device 2, transmitters 12 and a receiver 14 perform data communication with the electronic key 4 when the electronic key 4 is present within a predetermined area including the interior of the vehicle (electronic key response area). The transmitters 12 and the receiver 14, a door ECU 16 for allowing locking and unlocking activitys of a door, and an engine ECU 18 for engine control are connected to the smart ECU 10.

Figure 2:
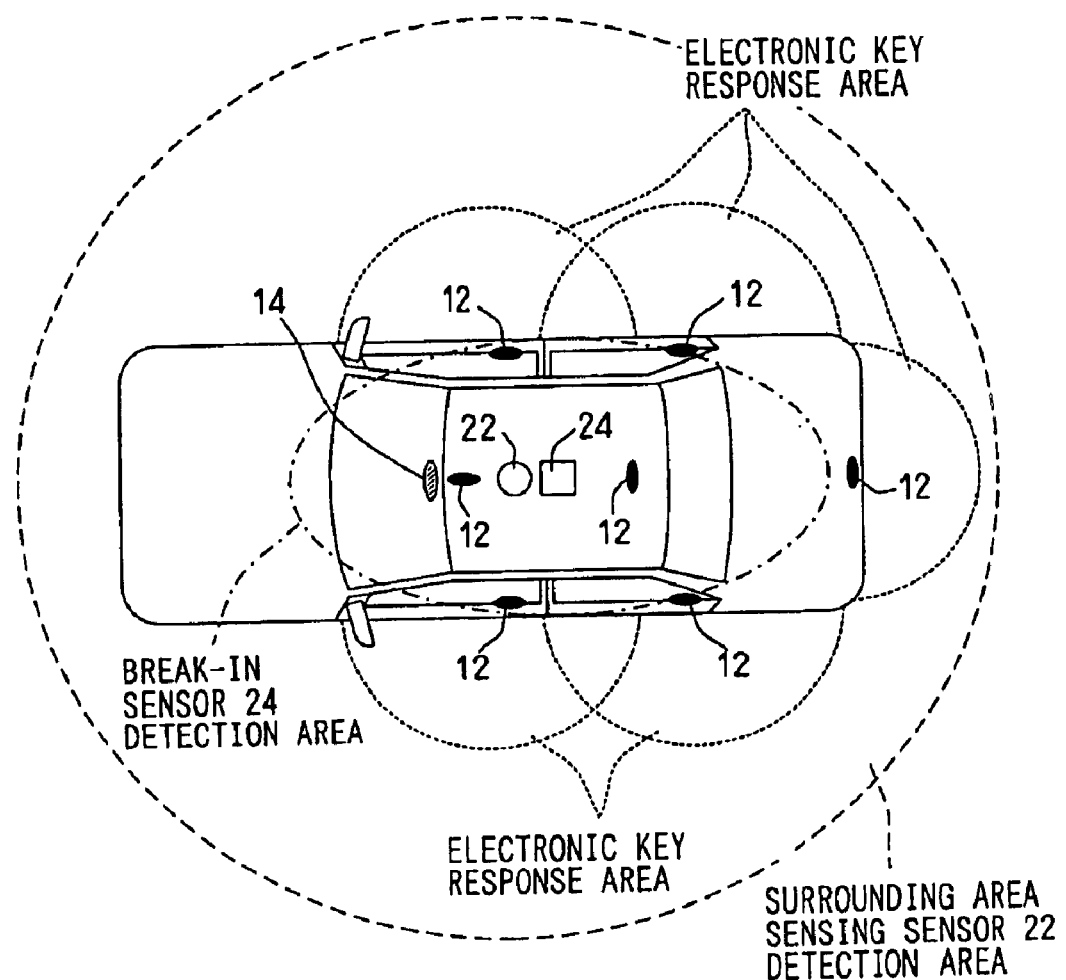
FIG. 2 is a diagram illustrating a detection area of an object using a surrounding area sensing sensor and a break-in sensor and a response area of an electronic key according to an embodiment of the present invention.

As shown in FIG. 2, the transmitters 12 are provided for the doors used for getting into and out of the vehicle, the trunk in the rear part of the vehicle, and within the interior of the vehicle to transmit a starting signal (a radio wave in a kHz to MHz band, which allows communication with the electronic key 4 without being affected by humans) to the electronic key 4. The electronic key 4 is present within the predetermined area in the interior of the vehicle and in the surrounding area of the vehicle (electronic key response area). The receiver 14 is for receiving a response signal transmitted from the electronic key 4 present within the electronic key response area in response to the starting signal.

For example, when someone who owns or possesses the electronic key 4 comes into the electronic key response area, and in turn, identification information inherent to the electronic key 4 is transmitted from the electronic key 4 as a response signal, the smart ECU 10 judges from the identification information whether the electronic key 4 is for the vehicle in question or not. If the electronic key 4 is for the vehicle in question, the smart ECU 10 notifies the door ECU 16 that the electronic key 4 is for that vehicle to permit the door ECU 16 to unlock the door. On the other hand, if a user who owns the electronic key 4 for the vehicle in question goes away from the vehicle so that the smart ECU 10 is no longer capable of receiving a response signal from the electronic key 4, the smart ECU 10 outputs an execution command for locking the door to the door ECU 16.

Moreover, the smart ECU 10 acquires an ignition signal (IG signal) from the engine ECU 18 so as to detect whether an engine functioning as a power source of the vehicle is currently operating or not. The ignition signal is also output to the door ECU 16 and the security ECU 20.

Upon reception of the signal allowing the unlocking of the door from the smart ECU 10, the door ECU 16 executes: automatic door unlock control for automatically unlocking the door when a switch for unlocking the door provided on the outer side of the door is operated; automatic door lock control for automatically locking the door upon reception of the execute command for locking the door from the smart ECU 10 or when the vehicle is brought into a running state at a speed higher than a predetermined running speed; manual door lock control for locking and unlocking the door in accordance with the activity state of an activity switch provided on the inner side of the door, and the like. The door ECU 16 is provided for each door of the vehicle.

In order to execute each of the above controls, the door ECU 16 is provided with a door sensor for detecting an open or close state of the door, a door lock sensor for detecting a locked or unlocked state of the door and the like. A detection signal from each of these sensors is also transferred to the security ECU 20 via the smart ECU 10.

On the other hand, the security ECU 20 includes: a surrounding area sensing sensor 22 for detecting the access of an object to the vehicle from the surrounding area of the vehicle; a break-in sensor 24 for detecting the break-in of an object into the interior of the vehicle; a sound alarm device 26 for sounding a buzzer for giving an alarm, a siren (which possesses an internal battery in order to operate even when the main power source of the vehicle is cut off), and the like; and an optical alarm device 28 for lighting or flashing an interior light, the hazard lights or the like.

As shown in FIG. 2, the surrounding area sensing sensor 22 emits a radio wave in a predetermined frequency band, for example, a GHz band. The radio wave is intended to strike an object, including a person, and be reflected within an area which is larger than but includes the electronic key response area and serves as a detection area for the object. The surrounding area sensing sensor 22 receives the reflected wave from the object so as to detect the break-in of the object into the detection area. In other words, the access of the object to, or near, the vehicle is detected.

The break-in sensor 24 serves to detect the illegal break-in of an object (that is, a person who is a potential person) into the interior of the vehicle. The break-in sensor 24 transmits and receives an ultrasonic wave as a signal for detection within the interior of the vehicle corresponding to the detection area so as to detect the illegal break-in of the person into the interior of the vehicle based on a change in the received ultrasonic wave.

When a user who possesses the electronic key 4 for the vehicle in question moves away from the vehicle so that the door ECU 16 locks all the doors in accordance with a command from the smart ECU 10, the security ECU 20 judges that the vehicle is now in a monitored mode and thus executes the following break-in monitoring process. First, the security ECU 20 actuates the surrounding area sensing sensor 22 so as to monitor the access of an object to the vehicle from the surrounding area of the vehicle through the surrounding area sensing sensor 22. When the access of the object to the vehicle is detected by the surrounding area sensing sensor 22, the security ECU 20 actuates the break-in sensor 24 so as to monitor the illegal break-in into the interior of the vehicle of someone who does not own the electronic key 4 for the vehicle in question. The security ECU 20 also monitors the illegal activity of the vehicle based on a detection signal from the door sensor, the door lock sensor or the like provided for the door ECU 16. Upon detection of the illegal break-in of a third party into the interior of the vehicle or the illegal activity of the vehicle, the security ECU 20 transmits the information indicating the occurrence of the illegal break-in or illegal activity to the information center 40 via the telematics ECU 30.

If the smart ECU 10 detects the electronic key 4 for the vehicle in question while the security ECU 20 is actuating the surrounding area sensing sensor 22 to monitor the access of the object to the vehicle, the smart ECU 10 determines that the object approaching the vehicle is a legitimate user of the vehicle. Because of this determination, the smart ECU 10 cancels the monitor mode, thereby terminating the break-in monitoring process by the security ECU 20.

Next, the telematics ECU 30 includes a GPS receiving device 32 for detecting the current position of the vehicle, an image pick-up device 34 for capturing images of the surrounding area of the vehicle, and a data communication device 36 for performing wireless data communication with the data communication device 42 of the information center 40.

The image pick-up device 34 corresponds to an image pick-up means of the present invention. In order to allow the images of the entire surrounding area of the vehicle to be captured, the image pick-up device 34 is constructed of an omni-directional camera equipped with a fish-eye lens and the like, or by a plurality of cameras, each having a wide viewing angle. Moreover, as a camera constituting the image pick-up device 34, an infrared camera capable of capturing the images even in the night is used.

Next, at the information center 40, data for communication which is required to perform the data communication with the anti-theft device 2 and the manager terminal 50 is stored for each vehicle in the vehicle database 46. The data for communication includes: data for vehicle identification, for identifying a vehicle on which the anti-theft device 2 is mounted based on an identification code attached to the information transmitted from the anti-theft device 2; data for terminal identification, for identifying a vehicle corresponding to the manager terminal 50 based on an identification code attached to the information transmitted from the manager terminal 50; destination data which is required to transmit the information to the manager terminal 50 or the anti-theft device 2, and the like. Data can be written in the vehicle database 46 for each vehicle from the vehicle monitoring computer 44.

The vehicle monitoring computer 44 uses the data for communication registered in the vehicle database 46 to perform data communication with the anti-theft device 2 and the manager terminal 50. The vehicle monitoring computer 44 writes the surrounding area information during vehicle monitoring, which is obtained by the data communication with the anti-theft device 2, to the vehicle database 46, and transmits the written surrounding area information, the vehicle information acquired from the anti-theft device 2 or the like, to the manager terminal 50 as the need arises.

The manager terminal 50 is an information terminal owned or possessed by a manager of the vehicle. A portable information terminal such as a portable telephone or a notebook personal computer is generally used as the manager terminal 50. For the data communication between the information center 40, and the anti-theft device 2 and the manager terminal 50, for example, a radiotelephone line is used.

Figure 3:
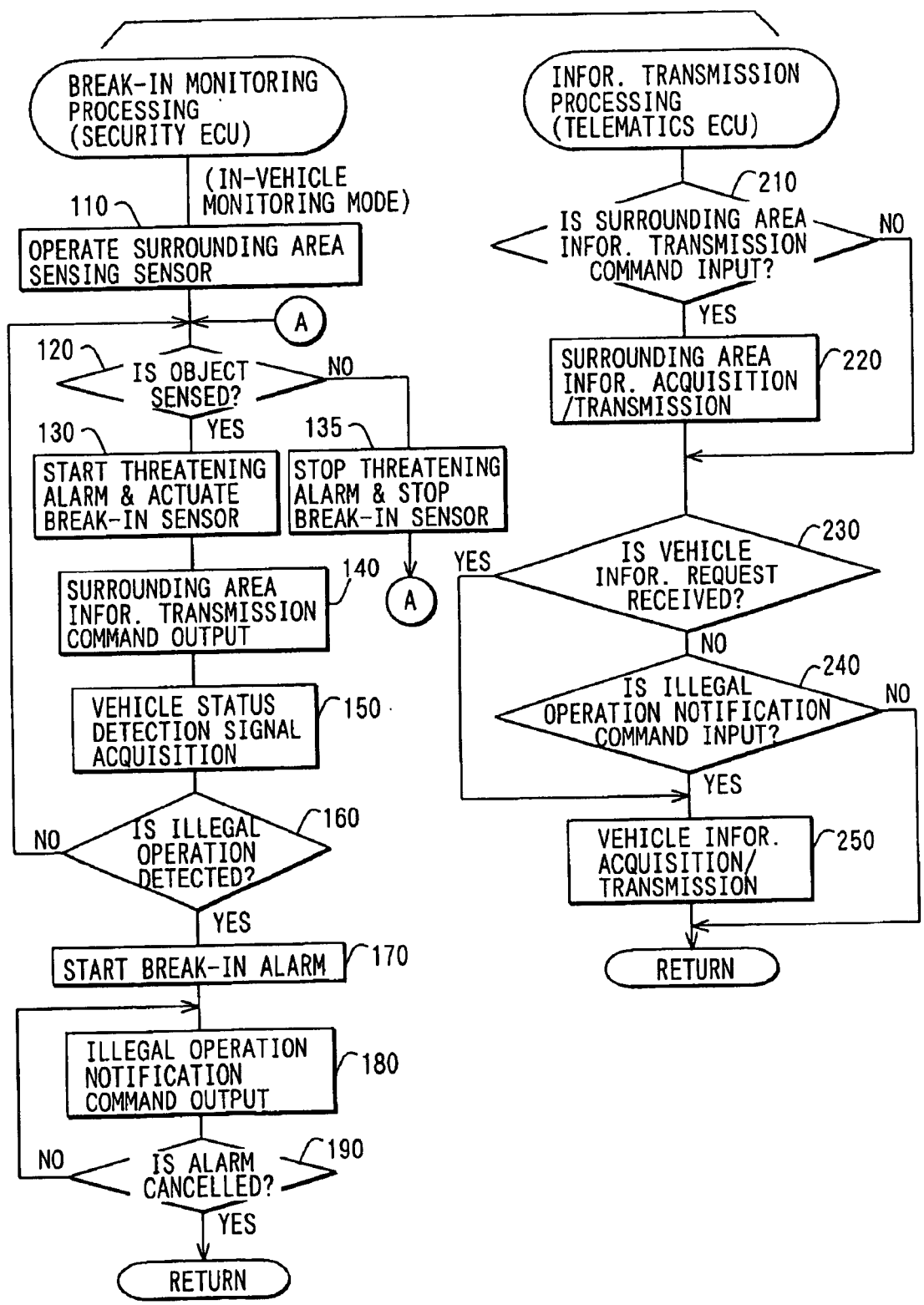
FIG. 3 is a flow chart showing break-in monitoring processing and information transmission processing executed in the anti-theft device according an embodiment of the present invention.

Next, FIG. 3 is a flow chart showing a break-in monitoring process executed in the security ECU 20 constituting the anti-theft device 2 and an information transmission process executed in the telematics ECU 30 to transmit information to the information center 40. The break-in monitoring process is a process executed in the security ECU 20 when a user is away from a vehicle, placing the vehicle in a monitored mode. When the break-in monitoring process is started, first, at step S110 (in the reference numerals, the letter "S" indicates a step), the surrounding area sensing sensor 22 is actuated. Subsequently, at step S120, it is determined whether the surrounding area sensing sensor 22 has detected an object approaching the vehicle or not.

If it is determined that the access of an object has been detected at step S120, at next step S130, the sound alarm device 26 and the optical alarm device 28 are operated so as to alert the person approaching the vehicle. At the same time, the break-in sensor 24 is actuated so as to output a surrounding area information transmission command to the telematics ECU 30 at subsequent step S140.

At the following step S150, various detection signals indicating the current status of the vehicle, such as a detection signal from the break-in sensor 24, a detection signal from the door sensor, the door lock sensor or the like, provided for the door ECU 16, and an IG signal from the engine ECU 18, are acquired. At subsequent step S160, it is determined whether an illegal activity (more specifically, unlocking of the door, opening and/or closing of the door, breaking into the interior of the vehicle, starting of the engine and the like by a third party) is performed on the vehicle by a third party who does not own or rightfully possess the electronic key 4 for the vehicle in question, based on the various detection signals acquired.

If the illegal activity of the vehicle by a third party is not detected at step S160, the processing returns to step S120. On the other hand, if the illegal activity of the vehicle is detected at step S160, the processing proceeds to step S170 where the sound alarm device 26 and the optical alarm device 28 are operated to inform the surrounding area of the vehicle that the vehicle is currently being illegally operated, being broken into, or tampered with by an unauthorized person or thief.

The break-in alarm is operated by continuously generating an alarming sound or by continuously lighting a hazard lamp or a room lamp. The alarm which is actuated at step S130 is issued in approximately the same manner as the break-in alarm. In the case of the alarm, however, an alarming sound is diminished, a time period for issuing the alarm is reduced, or the interval between the alarms is increased as compared with the case of the break-in alarm so as not to surprise a passenger merely passing by the vehicle.

At subsequent step S180, an illegal activity notification command is output to the telematics ECU 30. At step S190, it is determined whether the break-in alarm started at step S170 is cancelled by an external activity or not. If the break-in alarm is not cancelled, the processing returns to step S180 so as to continue the output of the illegal activity notification command to the telematics ECU 30. On the contrary, if the break-in alarm is cancelled, this processing is terminated.

In the case where it is determined that the access of an object to the vehicle is not detected by the surrounding area sensing sensor 22 at step S120, the alarms issued by the sound alarm device 26 and the optical alarm device 28 are stopped at step S135. At the same time, after stopping the activity of the break-in sensor 24, the processing returns to step S120 so as to continue monitoring the surrounding area of the vehicle, using the surrounding area sensing sensor 22.

In this embodiment, in the above-described break-in monitoring process, the function of the access detection means of the present invention is realized by the processings at steps S110 and S120 and the surrounding area sensing sensor 22 used in this processing. The function of the alarm means of the present invention is realized by the alarm processing at S130 and the sound alarm device 26 and the optical alarm device 28 used in this processing. The function of the illegal activity detection means of the present invention is realized by the processings at steps S150 and S160 and various sensors for vehicle status detection (such as the break-in sensor 24) used in this process.

On the other hand, the information transmission processing shown in FIG. 3 is repeatedly performed in the telematics ECU 30. When the information transmission processing is started, first, at step S210, it is determined whether a surrounding area information transmission command is input from the security ECU 20 or not. If the surrounding area information transmission command is not input, the processing continues to step S230. On the other hand, if the surrounding area information transmission command is input, images of the surrounding area of the vehicle captured by the image pick-up device 34, the current position of the vehicle detected by the GPS receiving device 32, the current time and the like are acquired as the surrounding area information. After performing the processing as the surrounding area information transmission means for transmitting the acquired surrounding area information from the data communication device 36 to the information center 40, the processing proceeds to step S230.

At step S230, it is determined whether the data communication device 36 has received a request signal for the vehicle information transmitted from the information center 40. In the case where the data communication device 36 has received the request signal for the vehicle information, the processing proceeds to subsequent step S250. On the contrary, if the data communication device 36 has not received the request signal for the vehicle information, the processing proceeds to subsequent step S240 so as to judge whether the illegal activity notification command is input from the security ECU 20 or not. If it is determined that the illegal activity notification command is not input at step S240, this processing is terminated. On the other hand, if it is determined that the illegal activity notification command is input at step S240, the processing proceeds to subsequent step S250.

At step S250, the processing as vehicle information transmission means of the present invention is executed. More specifically, signals indicating a preset vehicle state such as images of the surrounding area of the vehicle captured by the image pick-up device 34, the current position of the vehicle detected by the GPS receiving device 32, a detection signal from the break-in sensor 24, a detection signal from the door sensor, the door lock sensor or the like provided for the door ECU 16, an IG signal from the engine ECU 18 and the like, are acquired as vehicle information. The acquired vehicle information is transmitted from the data communication device 36 to the information center.

Figure 4:
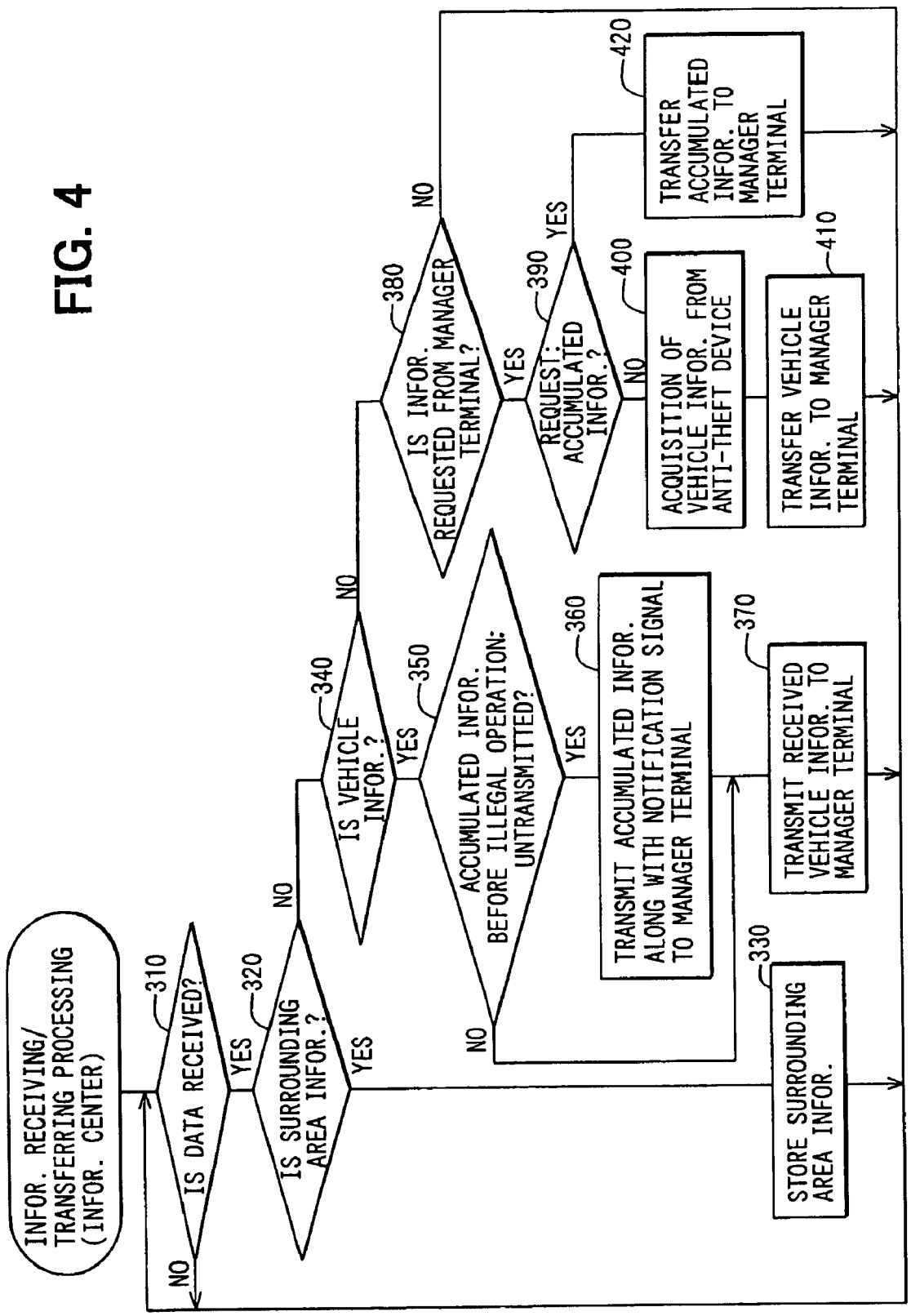
FIG. 4 is a flow chart showing information receiving and transferring processing executed in an information center according to an embodiment of the present invention.

Next, FIG. 4 is a flow chart showing information receiving/transferring processing executed in the vehicle monitoring computer 44 of the information center 40. As shown in step S310 of FIG. 4, it is determined whether the data communication device 42 has received the data transmitted from the anti-theft device 2 or the manager terminal 50 so as to wait for the data reception by the data communication device 42. When the data communication device 42 receives the data, it is determined whether the received data is the surrounding area information transmitted from the anti-theft device 2 or not at step S320. If the received data is the surrounding area data, after processing as surrounding area information storage means for storing the received surrounding area information in the vehicle database 46 serving as a storage medium at subsequent step S330, the processing returns to step S310.

When the surrounding area information is to be stored in the vehicle database 46, a vehicle, on which the anti-theft device 2 having transmitted the surrounding area information is mounted, is identified by using the data for communication stored in the vehicle database 46 for each vehicle and the identification code attached to the received surrounding area information. Then, the surrounding area information is stored in the vehicle database 46 as the surrounding area information of the identified vehicle.

Next, if the received data is determined not to be the surrounding area information at step S320, it is determined whether the received data is the vehicle information transmitted from the anti-theft device 2, or not, at step S340. If the received data is the vehicle information, it is determined that some illegal activity is performed on the vehicle on which the anti-theft device 2 having transmitted the vehicle information is mounted. Then, the processing proceeds to step S350.

At step S350, the illegally accessed or operated vehicle is identified by using the data for communication stored in the vehicle database 46 for each vehicle and the identification code attached to the vehicle information which has been received. Then, it is determined if the surrounding area information, which is accumulated immediately before determining if an illegal activity has been committed, that is, accumulated information among the surrounding area information of that vehicle accumulated in the vehicle database 46, has been already transmitted to the manager terminal 50.

If the accumulated information already has been transmitted to the manager terminal 50, the processing proceeds to step S370. If the accumulated information has not yet been transmitted to the manager terminal 50 the processing proceeds to step S370 after the accumulated information and a notification signal indicating that the vehicle has been illegally accessed or operated are transmitted to the manager terminal 50. The transmitting of the accumulated information and the notification signal correspond are indicated at step S360. At step S370, the vehicle information having been received is transmitted to the manager terminal 50 corresponding to the identified vehicle. Then, the processing returns to step S310.

The accumulated information, which is determined to be transmitted or not at step S350 and is transmitted to the manager terminal at step S360 in the case of untransmission, may be the surrounding area information (the images of the surrounding area and the like) of the vehicle immediately before the illegal activity on the vehicle takes place. Therefore, it is not necessary to transmit all the surrounding area information stored in the vehicle database 46 until then. Accordingly, at steps S350 and S360, the surrounding area information which is continuously accumulated immediately before the judgment of the illegal activity, based on the reception of the vehicle information, is treated as the accumulated information to be transmitted to the manager terminal 50. In this embodiment, a series of the processings from steps S340 to S370 function as illegal activity notification means of the present invention.

Next, in the case where the received data is determined not to be the vehicle information transmitted from the anti-theft device 2 at step S340, the processing proceeds to step S380 where it is determined whether the received data is information requested from the manager terminal 50 or not. If the received data is not the information requested from the manager terminal 50, it is determined as a reception error, so that the processing returns to step S310. On the other hand, if the received data is the information requested from the manager terminal 50, the processing proceeds to step S390.

At step S390, it is determined whether the information requested from the manager terminal 50 is the previously accumulated information of the surrounding area information stored in the vehicle database 46 or the vehicle information indicating the current status of the vehicle. If the request from the manager terminal 50 is for the accumulated information, a vehicle corresponding to the manager terminal 50 requiring the accumulated information is identified by using the data for communication stored in the vehicle database 46 for each vehicle and the identification code attached to the received information transmitted from the manager terminal 50. After processing as the vehicle information transfer means, for reading out the accumulated information (surrounding area information) corresponding to that vehicle from the vehicle database 46 so as to transfer the readout information to the manager terminal 50 is executed, the processing returns to step S310.

On the other hand, if the request from the manager terminal 50 is for the vehicle information, the processing proceeds to step S400 where a vehicle corresponding to the manager terminal 50 requiring the vehicle information is identified and a request signal for the vehicle information is transmitted to the anti-theft device 2 mounted on the vehicle so as to acquire the current vehicle information from the anti-theft device 2. At a subsequent step S410, the acquired vehicle information is transferred to the manager terminal 50 requiring that vehicle information. Then, the processing returns to step S310.

As described above, in the anti-theft system of this embodiment, the anti-theft device 2 mounted on the vehicle monitors an object approaching the vehicle from the surrounding area of the vehicle by using the surrounding area sensing sensor 22 through the activity of the security ECU 20 when a user moves away from the vehicle causing the anti-theft device 2 to be brought into the monitoring mode for the vehicle. When the surrounding area sensing sensor 22 detects an object approaching the vehicle during monitoring, the security ECU 20 issues an alarm to that object. Simultaneously, the information of the surrounding area of the vehicle at that moment (the images of the surrounding area, the current position of the vehicle and the like in this embodiment) is repeatedly transmitted to the information center 40 by the activity of the telematics ECU 30. The thus transmitted surrounding area information from the anti-theft device 2 is accumulated in the vehicle database 46 by the activity of the vehicle monitoring computer 44 provided for the information center 40.

When the vehicle is illegally accessed by the object (thief or the like) while the security ECU 20 is detecting the object approaching the vehicle on the side of the anti-theft device 2, the security ECU 20 detects the occurrence of the illegal activity by using the break-in sensor 24 or the like and issues a break-in alarm so as to inform the surrounding area of the vehicle that the illegal activity is occuring. At the same time, the security ECU 20 causes the telematics ECU 30 to repeatedly transmit the vehicle information indicating vehicle status at a particular moment to the information center 40. Examples of vehicle status may include: a door on which the illegal activity is performed, a break-in into the interior of the vehicle, starting of the engine, images of the surrounding area of the vehicle, the current vehicle location, and the like.

When the vehicle information is transmitted from the anti-theft device 2 in this manner, the information center 40 determines if the vehicle whose vehicle information has been transmitted is currently being illegally accessed or operated, based on the activity of the vehicle monitoring computer 44. The information center 40 transmits the surrounding area information accumulated in the vehicle database 46 before the vehicle is illegally accessed or operated, along with a notification signal indicating the occurrence of the illegal activity, to the manager terminal 50 on the vehicle manager. Thereafter, the vehicle information transmitted from the anti-theft device 2 is sequentially transferred to the manager terminal 50 on the vehicle manager.

Therefore, according to the anti-theft system of the present invention, immediately after the vehicle which is registered to the anti-theft system (in the other words, the vehicle on which the anti-theft device 2 is mounted) is illegally accessed or operated, the information of the surrounding area of the vehicle (image information containing the image of the person and the like) before the vehicle is illegally accessed or operated is transmitted. As a result, even if the person who has illegally accessed the vehicle breaks into the vehicle to break the data communication device 36 or the anti-theft device 2 itself, the surrounding area information containing the image of the person can be transmitted to the manager terminal 50. Therefore, the vehicle manager can identify and find the person.

Moreover, for example, if a person breaks the data communication device 36 or the anti-theft device 2 itself during a time period from the beginning of the illegal activity of the vehicle until the first transmission of the vehicle information by the anti-theft device 2, the information center 40 is no longer capable of recognizing that the vehicle is being illegally operated, tampered with, etc. Even in such a case, before the occurrence of the illegal activity of the vehicle, the surrounding area information is accumulated in the vehicle database 46. Therefore, in the case where the vehicle is stolen or the like, the person can be identified by using the surrounding area information accumulated in the vehicle database 46.

In this embodiment, in particular, since the information center 40 transfers the surrounding area information accumulated in the vehicle database 46 to the manager terminal 50 in accordance with the request from the manager terminal 50, the vehicle manager can acquire the surrounding area vehicle information the moment before the occurrence of the theft or attempted entry without going to the information center 40, thereby easily identifying the person. Thus, according to this embodiment, the number of people who attempt to illegally operate the vehicles can be reduced to prevent the occurrence of vehicle theft cases.

Although an embodiment of the present invention has been described above, the present invention is not limited to the above embodiment. Various modes of the present invention are possible. For example, in the above embodiment, it is described that the accumulation of the surrounding area information upon detection of someone approaching the vehicle is performed by the information center 40. Alternatively, the surrounding area information may be accumulated by the anti-theft device 2. Then, immediately after an illegal activity of the vehicle performed on the anti-theft device 2 is detected, the accumulated surrounding area information may be transmitted to the information center 40 along with the vehicle information of that moment.

Although it is described in the above embodiment that the transmission of information to the manager terminal 50 is entirely performed from the information center 40, a part of the information such as the notification signal indicating that the vehicle is illegally accessed may be directly transmitted from the anti-theft device 2 to the manager terminal 50. Alternatively, all the information may be directly transmitted and received between the anti-theft device 2 and the manager terminal 50 without using the information center 40.

As another embodiment of the present invention, an anti-theft system, in which all the information is directly transmitted and received between the anti-theft device 2 and the manager terminal 50 without using the information center 40, will be described. This anti-theft system is realized by applying the first to third aspects of the invention to the anti-theft device 2 mounted on the vehicle. The system structure of this anti-theft system is the same as that shown in FIG. 1 except that the information center 40 is omitted. Accordingly, a structure of the anti-theft device 2 may be the same as that described in the above embodiment.

Figure 5:
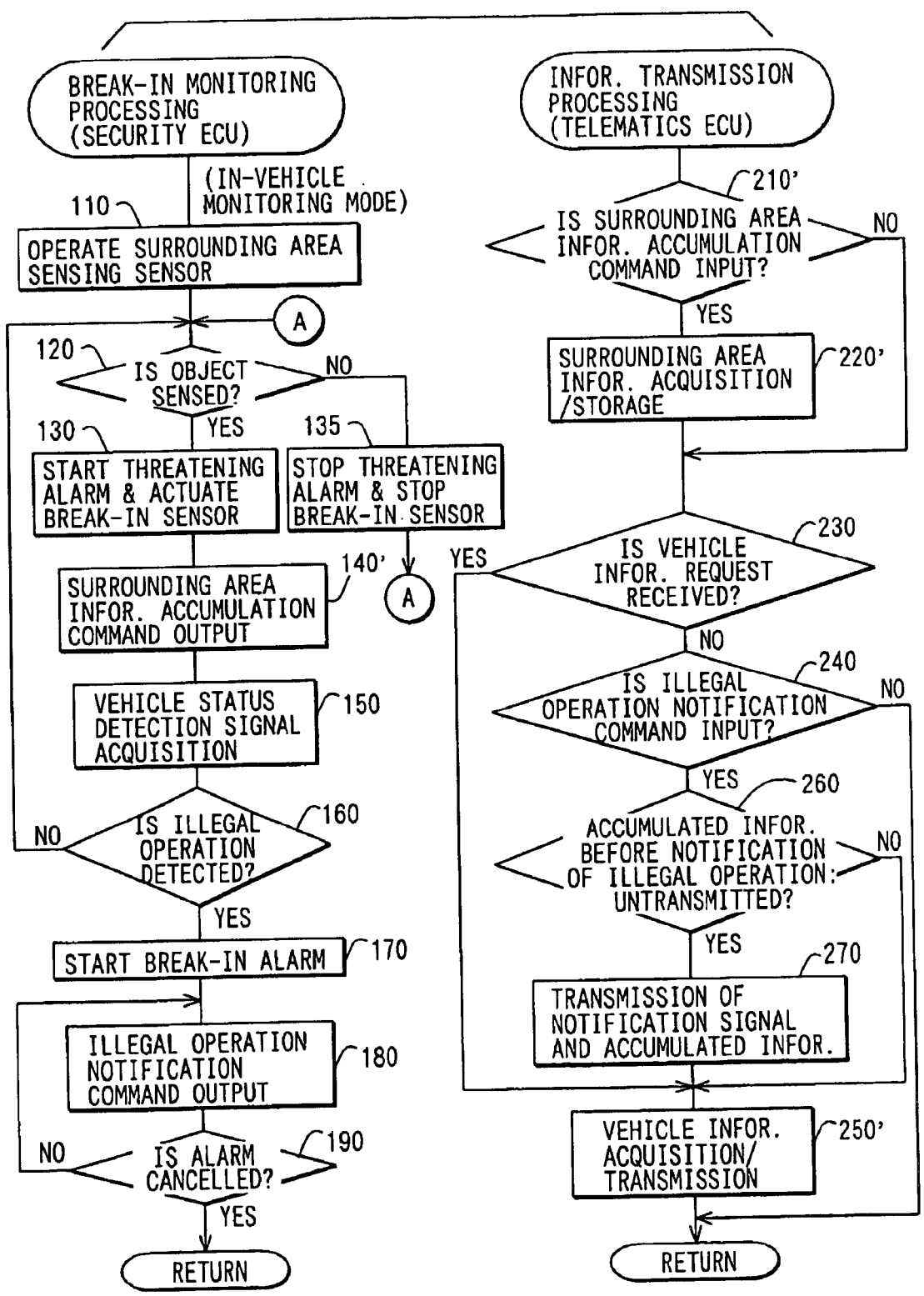
FIG. 5 is a flow chart showing a modification of a break-in monitoring process and an information transmission process executed in the anti-theft device.

The anti-theft system of this embodiment can be realized by changing a part of the break-in monitoring process and the information transmission process executed in the security ECU 20 and the telematics ECU 30 of the above-described embodiment, as shown in FIG. 5.

More specifically, as shown in FIG. 5, in the break-in monitoring process executed in the security ECU 20, instead of outputting the surrounding area information transmission command to the telematics ECU 30 in the processing at step S140, which is executed upon detection of an object approaching the vehicle at step S120, a process for outputting a command for accumulating the surrounding area information to the telematics ECU 30 is executed (step S140').

On the other hand, in the information transmission processing executed in the telematics ECU 30, instead of the processings at steps S210 and S220 where it is determined that the surrounding area information transmission command is input from the security ECU 20 so as to transmit the surrounding area information to the information center 40, it is determined whether a surrounding area information accumulation command is input from the security ECU 20 or not at step S210'. If the surrounding area information accumulation command is not input, the processing proceeds to step S230. On the other hand, if the surrounding area information accumulation command is input at step S220', the images of the surrounding area of the vehicle captured by the image pick-up device 34, the current position of the vehicle detected by the GPS receiving device 32, the current time and the like are acquired as the surrounding area information. The acquired surrounding area information is stored in memory (not shown) serving as a storage medium provided in the telematics ECU 30.

In the case where it is determined that the illegal activity notification command is input from the security ECU 20, the processing does not proceed to step S250' for transmitting the vehicle information, but to steps S260 and S270. More specifically, when the illegal activity notification command is input from the security ECU 20, the processing proceeds to step S260 where it is determined whether the surrounding area information accumulated in the memory (accumulated information), before the security ECU 20 has detected the illegal activity, has already been transmitted to the manager terminal 50 or not. If the accumulated information has already been transmitted to the manager terminal 50, the processing proceeds to step S250. On the other hand, if the accumulated information has not yet been transmitted to the manager terminal 50, after the accumulated information and a notification signal indicating that the vehicle is illegally accessed are transmitted to the manager terminal 50 at step S270, the processing proceeds to step S250'.

At step S250', signals indicating a preset vehicle state such as the images of the surrounding area of the vehicle captured by: the image pick-up device 34; the current position of the vehicle detected by the GPS receiving device 32; a detection signal from the break-in sensor 24; a detection signal from the door sensor, the door lock sensor or the like provided for the door ECU 16; and an IG signal from the engine ECU 18 are acquired as the vehicle information. The acquired vehicle information is directly transmitted from the data communication device 36 to the manager terminal 50.

From a decision pertaining to reception of a vehicle information request at step S230, it is determined whether a request signal transmitted from the manager terminal 50 has been received or not. If the request for the vehicle information is determined at step S230, the vehicle information is transmitted to the manager terminal 50 requesting the vehicle information at step S250'.

If the break-in monitoring processing and the information transmission processing executed in the security ECU 20 and the telematics ECU 30 are changed in this manner, the anti-theft device 2 is allowed to perform direct data communication with the manager terminal 50. As a result, the notification signal indicating the occurrence of the illegal activity, and the surrounding area information before the occurrence of the illegal activity of the vehicle (image information containing the image of the person and the like), are transmitted immediately after the vehicle is illegally accessed by a third party.

Additionally, related to the anti-theft device 2 when the vehicle is illegally accessed by a third party, the surrounding area information containing the image of the person can be transmitted to the manager terminal 50 before the person breaks into the vehicle to break the data communication device 36 and the anti-theft device 2 itself. Accordingly, as in the above-described embodiment, the number of people who attempt to illegally access the vehicles can be reduced, thereby preventing vehicle thefts.

Although the setting and unsetting of the anti-theft system, in other words, the setting and unsetting of the monitoring mode, is automatically performed by using an electronic key system (smart system), a setting and unsetting method of a general security system may be used. That is, the wireless setting and unsetting using a signal which is transmitted by a user by activity of a portable wireless, the setting/unsetting with a mechanical key, performed by manual activity of a key for a vehicle (mechanical key) by a user and the like, may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle anti-theft device, comprising:
   illegal activity detection means for detecting illegal activity conducted on a vehicle;
   vehicle information transmission means for acquiring vehicle information indicating a status of the vehicle so as to wirelessly transmit the vehicle information to one of a vehicle manager information terminal and an anti-theft information center when the illegal activity of the vehicle is detected by the illegal activity detection means;

access detection means for detecting access of an object to the vehicle from a surrounding area of the vehicle; and surrounding area information storage means for acquiring surrounding area information indicating a state of the surrounding area of the vehicle so as to store the surrounding area information in a predetermined storage medium when the access of the object to the vehicle is detected by the access detection means, wherein the vehicle information transmission means transmits the surrounding area information stored in the storage medium to one of the vehicle manager information terminal and the anti-theft information center immediately after detection of the illegal activity of the vehicle by the illegal activity detection means.

2. The vehicle anti-theft device according to claim 1, comprising alarm means for activating an alarm for alerting the surrounding area of the vehicle when access of the object to the vehicle is detected by the access detection means.

3. The vehicle anti-theft device according to claim 1, wherein the surrounding area information storage means includes an image pick-up means for capturing an image of the surrounding area of the vehicle, so that image information acquired by the image pick-up means is stored as the surrounding area information in the storage medium.

4. The vehicle anti-theft device according to claim 2, wherein the surrounding area information storage means includes an image pick-up means for capturing an image of the surrounding area of the vehicle, so that image information acquired by the image pick-up means is stored as the surrounding area information in the storage medium.

5. A vehicle anti-theft device comprising:

illegal activity detection means for detecting illegal activity conducted on a vehicle;

vehicle information transmission means for acquiring vehicle information indicating a status of the vehicle so as to wirelessly transmit the vehicle information to an anti-theft information center when the illegal activity of the vehicle is detected by the illegal activity detection means;

access detection means for detecting access of an object to the vehicle from a surrounding area of the vehicle; and surrounding area information transmission means for acquiring surrounding area information indicating a state of the surrounding area of the vehicle so as to wirelessly transmit the surrounding area information to the anti-theft information center when the access of the object to the vehicle is detected by the access detection means.

6. The vehicle anti-theft device according to claim 5, further comprising:

an alarm means for giving an alarm for alerting the surrounding area of the vehicle when access of the object to the vehicle is detected by the access detection means.

7. The vehicle anti-theft device according to claim 6, wherein the surrounding area information transmission means includes image pick-up means for capturing an image of the surrounding area of the vehicle, so that image information acquired by the image pick-up means is transmitted as the surrounding area information to the anti-theft information center.

8. An anti-theft information center, for receiving information transmitted from the vehicle anti-theft device according to claim 6, comprising:

surrounding area information storage means for storing surrounding area information transmitted from the surrounding area information transmission means of the anti-theft device in a predetermined storage means; and illegal activity notification means for identifying an illegally accessed vehicle from vehicle information upon reception of the vehicle information transmitted from the vehicle information transmission means of the anti-theft device so as to notify a vehicle manager information terminal corresponding to the illegally operated vehicle of the illegal activity of the vehicle.

9. The vehicle anti-theft device according to claim 5, wherein the surrounding area information transmission means includes an image pick-up means for capturing an image of the surrounding area of the vehicle, so that image information acquired by the image pick-up means is transmitted as the surrounding area information to the anti-theft information center.

10. An anti-theft information center, for receiving information transmitted from the vehicle anti-theft device according to claim 9 comprising:

surrounding area information storage means for storing surrounding area information transmitted from the surrounding area information transmission means of the anti-theft device in a predetermined storage means; and illegal activity notification means for identifying an illegally accessed vehicle from vehicle information upon reception of the vehicle information transmitted from the vehicle information transmission means of the anti-theft device so as to notify a vehicle manager information terminal corresponding to the illegally operated vehicle of the illegal activity of the vehicle.

11. An anti-theft information center, for receiving information transmitted from the vehicle anti-theft device according to claim 5, comprising:

surrounding area information storage means for storing surrounding area information transmitted from the surrounding area information transmission means of the anti-theft device in a predetermined storage means; and illegal activity notification means for identifying an illegally accessed vehicle from vehicle information upon reception of the vehicle information transmitted from the vehicle information transmission means of the anti-theft device so as to notify a vehicle manager information terminal corresponding to the illegally operated vehicle of the illegal activity of the vehicle.

12. The anti-theft information center, according to claim 11, wherein the illegal activity notification means identifies the illegally operated vehicle from the vehicle information upon reception of the vehicle information so as to read out the surrounding area information corresponding to the vehicle from the storage medium, thereby transferring the readout surrounding area information and the received vehicle information to a corresponding vehicle manager information terminal.

13. The anti-theft information center according to claim 12, further comprising:

surrounding area information transfer means for, upon reception of a transmission request for the surrounding area information from the vehicle manager information terminal, reading out surrounding area information of a vehicle corresponding to the vehicle manger side information terminal from the storage medium in accordance with the transmission request so as to transfer the readout surrounding area information to the corresponding vehicle manager information terminal.

14. A vehicle anti-theft device, comprising:

an illegal activity detector configured to detect illegal activity conducted on a vehicle;

a vehicle information transmitter configured to:
  acquire vehicle information indicating a status of the vehicle, and
  wirelessly transmit the acquired vehicle information to one of: a vehicle manager information terminal, and an anti-theft information center, when the illegal activity of the vehicle is detected by the illegal activity detector;

access detector configured to detect access of an object toward the vehicle from a surrounding area of the vehicle; and surrounding area information storage device configured to:
  acquire surrounding area information indicating a state of the surrounding area of the vehicle, and
  store the surrounding area information in a predetermined storage medium when the access of the object to the vehicle is detected by the access detector, wherein the vehicle information transmitter transmits the surrounding area information stored in the storage medium to one of: the vehicle manager information terminal, and the anti-theft information center, immediately after detection of the illegal activity of the vehicle by the illegal activity detector.

15. A vehicle anti-theft device according to claim 14, wherein the surrounding area information storage device is further configured to detect that the object is a person.

16. The vehicle anti-theft device according to claim 14, further comprising an alarm configured to alert in an area surrounding the vehicle when access of the object toward the vehicle is detected by the access detector.

17. The vehicle anti-theft device according to claim 16, wherein the surrounding area information storage device includes an image pick-up device for capturing an image of the surrounding area of the vehicle, so that image information acquired by the image pick-up device is stored as the surrounding area information in the storage medium.

18. The vehicle anti-theft device according to claim 17, wherein the image pick-up device includes an infrared camera.

19. The vehicle anti-theft device according to claim 14, wherein the surrounding area information storage device includes an image pick-up device for capturing an image of the surrounding area of the vehicle, so that image information acquired by the image pick-up device is stored as the surrounding area information in the storage medium.

20. The vehicle anti-theft device according to claim 19, wherein the image pick-up device includes an infrared camera.

* * * * *